(12) United States Patent
Sekizuka et al.

(10) Patent No.: US 11,524,610 B2
(45) Date of Patent: Dec. 13, 2022

(54) VEHICLE SEAT SYSTEM

(71) Applicant: TOYOTA JIDOSHA KABUSHIKI KAISHA, Toyota (JP)

(72) Inventors: Makoto Sekizuka, Toyota (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 670 days.

(21) Appl. No.: 16/552,754

(22) Filed: Aug. 27, 2019

(65) Prior Publication Data

US 2020/0101874 A1    Apr. 2, 2020

(30) Foreign Application Priority Data

Sep. 27, 2018   (JP) .............................. JP2018-182811

(51) Int. Cl.
| | | |
|---|---|---|
| *B60N 2/20* | (2006.01) | |
| *B60N 2/22* | (2006.01) | |
| *B60N 2/02* | (2006.01) | |
| *B60N 2/16* | (2006.01) | |

(52) U.S. Cl.
CPC ......... *B60N 2/2209* (2013.01); *B60N 2/0252* (2013.01); *B60N 2/0284* (2013.01); *B60N 2/16* (2013.01); *B60N 2/1675* (2013.01); *B60N 2/1695* (2013.01); *B60N 2002/0268* (2013.01)

(58) Field of Classification Search
CPC ...... B60N 2/16; B60N 2/1675; B60N 2/1695; B60N 2/0244; B60N 2/0248; B60N 2/044; B60N 2/0252; B60N 2002/0268; B60N 2002/0272
See application file for complete search history.

(56) References Cited

U.S. PATENT DOCUMENTS

| | | |
|---|---|---|
| 6,168,198 B1 | 1/2001 | Breed et al. |
| 8,448,529 B2 * | 5/2013 | Aoyama ............... B60N 2/1695 73/862.391 |
| 2008/0021616 A1 | 1/2008 | Aoki et al. |
| 2011/0241400 A1 | 10/2011 | Ito et al. |
| 2014/0346830 A1 | 11/2014 | Tanaka et al. |

FOREIGN PATENT DOCUMENTS

| | | |
|---|---|---|
| CN | 1899890 A | 1/2007 |
| EP | 2 407 343 A1 | 1/2012 |
| JP | H05-077686 A | 3/1993 |
| JP | 2002-211353 A | 7/2002 |
| JP | 2006-088714 A | 4/2006 |
| JP | 2011-131698 A | 7/2011 |
| JP | 2011-131699 A | 7/2011 |
| JP | 2011-213149 A | 10/2011 |
| JP | 2014-227032 A | 12/2014 |

* cited by examiner

*Primary Examiner* — Syed A Islam
(74) *Attorney, Agent, or Firm* — Oliff PLC

(57) ABSTRACT

In a vehicle seat system, lowering of a seat cushion further toward a vehicle lower side than a lowerable limit value corresponding to a recline angle of a seatback is restricted by a control device in cases in which the physical build of an occupant is smaller than a predetermined value. This enables a reduction in the ability to restrain the body of the occupant using a webbing to be suppressed.

6 Claims, 11 Drawing Sheets

VEHICLE SEAT SYSTEM

CROSS-REFERENCE TO RELATED APPLICATION

This application is based upon and claims the benefit of priority of the prior Japanese Patent Application No. 2018-182811, filed on Sep. 27, 2018, the entire content of which is incorporated herein by reference.

BACKGROUND

Technical Field

The present disclosure relates to a vehicle seat system configured including a vehicle seat installed in a vehicle.

Related Art

A vehicle seat system configured including a vehicle seat installed in a vehicle and on which an occupant of the vehicle sits is provided with system configuration devices. Examples of system configuration devices include a seatbelt device that restrains the body of the occupant seated in the vehicle seat using a webbing, a recliner device that changes an angle of incline of a seatback of the vehicle seat toward the vehicle rear side, and a lift device that changes a vehicle vertical direction height of a seat cushion of the vehicle seat (as examples, see Japanese Patent Application Laid-Open (JP-A) Nos. 2011-213149 (Patent Document 1), and 2002-211353 (Patent Document 2).

However, in configurations in which a buckle of the seatbelt device does not follow vehicle vertical direction movement of the vehicle seat by the lift device, the ability to restrain the body of the occupant using the webbing may be reduced as a result of changes to the sitting position or the sitting posture of the occupant in the vehicle seat, an increase in the tension of the webbing, or the like, depending on factors such as the physical build, sitting position, and sitting posture of the occupant.

SUMMARY

In consideration of the above circumstances, an object of the present disclosure is to obtain a vehicle seat system capable of suppressing a reduction in the ability to restrain the body of an occupant using a webbing.

A vehicle seat system according to a first aspect includes a vehicle seat, a seatbelt device, a sitting state changing device, and a control device. The vehicle seat is provided with a seatback at a vehicle rear side of a seat cushion on which an occupant can sit. The seatbelt device restrains at least the waist region of the occupant using an elongated belt-shaped webbing by retaining a tongue provided to the webbing with a buckle in a state in which the webbing has been passed across the body of the occupant. The sitting state changing device is configured to actuate such that at least one out of the seat cushion or the seatback is moved so as to change a sitting state, the sitting state being a sitting position of the occupant or a sitting posture of the occupant. The control device is configured to restrict movement of at least one out of the seat cushion or the seatback by the sitting state changing device based on one or both out of a physical build of the occupant seated in the vehicle seat or a relative positional relationship between the vehicle seat and the buckle.

In the vehicle seat system according to the first aspect, actuation of the sitting state changing device moves at least one out of the seat cushion or the seatback. The sitting state, this being the sitting position or the sitting posture of the occupant in the vehicle seat, is changed by moving the at least one out of the seat cushion or the seatback.

Note that the movement of the at least one out of the seat cushion or the seatback by the sitting state changing device is restricted by the control device based on one or both out of the physical build of the occupant seated in the vehicle seat or the relative positional relationship between the vehicle seat and the buckle. This restriction by the control device is capable of suppressing changes to a worn state of the webbing over the body of the occupant, for example changes to an overlap amount between the waist region (pelvis) of the occupant and the webbing of the seatbelt device, based on the one or both out of the physical build of the occupant or the relative positional relationship between the vehicle seat and the buckle.

A vehicle seat system according to a second aspect is the vehicle seat system of the first aspect, wherein the sitting state changing device is configured including a lift device configured to actuate such that the seat cushion is raised or lowered in the vehicle vertical direction, and the control device is configured to restrict lowering of the seat cushion by the lift device.

In the vehicle seat system according to the second aspect, the sitting state changing device is configured by the lift device, and the seat cushion of the vehicle seat is raised or lowered in the vehicle vertical direction by actuation of the lift device. The sitting position of the occupant in the vehicle seat is changed in the vehicle vertical direction by this raising or lowering of the seat cushion.

Were the buckle of the seatbelt device (in other words, the position of the webbing at the tongue retained by the buckle) to be disposed further toward the vehicle upper side than the waist region of the occupant seated in the vehicle seat, the overlap amount between the waist region (pelvis) of the occupant and the webbing of the seatbelt device might be reduced. Note that a lowerable range of the seat cushion by the lift device is restricted by the control device. Restriction of the lowerable range of the seat cushion enables lowering of the waist region of the occupant together with the seat cushion to be restricted.

A vehicle seat system according to a third aspect is the vehicle seat system of the second aspect, wherein the control device restricts lowering of the seat cushion by the lift device in cases in which the physical build of the occupant seated in the vehicle seat is smaller than a predetermined size.

In the vehicle seat system according to the third aspect, the control device restricts lowering of the seat cushion by the lift device in cases in which the physical build of the occupant seated in the vehicle seat is smaller than the predetermined size.

In cases in which the occupant seated in the vehicle seat has a small physical build, the waist region of the occupant is positioned further toward the vehicle lower side than in the case of an occupant with a large physical build. Lowering of the seat cushion by the lift device is restricted in cases in which the physical build of the occupant is smaller than the predetermined size as described above enables the waist region of an occupant with a small physical build to be suppressed from being positioned further toward the vehicle lower side than the buckle of the seatbelt device.

A vehicle seat system according to a fourth aspect is the vehicle seat system according to the second aspect or the third aspect, wherein the sitting state changing device is configured including a recliner device that is actuated to pivot the seatback in a vehicle front-rear direction about a vehicle lower side end portion of the seatback, and the control device is configured to restrict lowering of the seat cushion such that a lowerable range of the seat cushion by the lift device is reduced as a tilt angle of the seatback toward the vehicle rear side is increased by the recliner device.

In the vehicle seat system according to the fourth aspect, the seatback of the vehicle seat is pivoted in the vehicle front-rear direction about the vehicle lower side end portion of the seatback when the recliner device is actuated. The sitting posture of the occupant seated in the vehicle seat is thereby changed.

As the tilt angle of the seatback toward the vehicle rear side increases, the tilt toward the vehicle rear side of the waist region of the occupant (in other words the pelvis of the occupant) seated in the vehicle seat also increases. When the tilt of the waist region of the occupant toward the vehicle rear side increases in this manner, the overlap amount between the webbing of the seatbelt device and waist region (pelvis) of the occupant might be reduced.

If the buckle of the seatbelt device (in other words, a position on the webbing at the tongue retained by the buckle) were to be disposed further toward the vehicle upper side than the waist region of the occupant seated in the vehicle seat, the overlap amount between the waist region (pelvis) of the occupant and the webbing of the seatbelt device might be reduced.

As the tilt angle of the seatback toward the vehicle rear side by the recliner device increases, lowering of the seat cushion is restricted so as to reduce the lowerable range of the seat cushion by the lift device.

A vehicle seat system according to a fifth aspect is the vehicle seat system according to the fourth aspect, wherein in cases in which the seatback has been pivoted further toward the vehicle rear side than a pivot angle of the seatback toward the vehicle rear side corresponding to a lowerable limit value configuring a lower limit of the lowerable range of the seat cushion by the control device, the control device actuates the lift device to raise the seat cushion to at least the lowerable limit value.

In the vehicle seat system according to the fifth aspect, the lift device is actuated by the control device when the seatback has been pivoted further toward the vehicle rear side than the pivot angle of the seatback toward the vehicle rear side corresponding to the lowerable limit value of the seat cushion. Actuation of the lift device raises the seat cushion to at least the lowerable limit value of the seat cushion corresponding to the pivot angle of the seatback in this state.

A vehicle seat system according to a sixth aspect is the vehicle seat system according to of any one of the second aspect to the fifth aspect, wherein a lowerable limit value configuring a lower limit of a lowerable range of the seat cushion by the control device is configured such that a fold-back position of the webbing at the tongue retained by the buckle is at the same vehicle vertical direction position as a hip point of the occupant, or at a position disposed further toward the vehicle lower side than the hip point.

In the vehicle seat system according to the sixth aspect, the seat cushion can be lowered as far as the lowerable limit value configuring the lower limit of the lowerable range of the seat cushion by the control device using the lift device. In this manner, in a state in which the seat cushion has been lowered to the lowerable limit value, the fold-back position of the webbing at the tongue retained by the buckle is disposed at the same vehicle vertical direction position as the hip point of the occupant, or is disposed further toward the vehicle lower side than the hip point. The buckle of the seatbelt device is thus disposed further toward the vehicle lower side than the waist region of the occupant seated in the vehicle seat.

A vehicle seat system according to a seventh aspect includes a vehicle seat, a seatbelt device, a pre-tensioner, and a control device. The vehicle seat is provided with a seatback at a vehicle rear side of a seat cushion on which an occupant can sit. The seatbelt device seatbelt device restrains at least the waist region of the occupant using an elongated belt-shaped webbing by retaining a tongue provided to the webbing with a buckle in a state in which the webbing has been passed across the body of the occupant. The pre-tensioner is configured to actuate to move the buckle in order to increase tension of the webbing. The control device is configured to restrict actuation of the pre-tensioner based on a physical build of the occupant seated in the vehicle seat.

In the vehicle seat system according to the seventh aspect, when the pre-tensioner is actuated in a state in which the webbing of the seatbelt device is being worn over the body of the occupant seated in the vehicle seat, the buckle is moved such that the tongue provided to the webbing is moved together with the buckle. This increases the tension of the webbing, thereby increasing the restraint force on the body of the occupant from the webbing.

In cases in which the occupant seated in the vehicle seat has a small physical build, the overlap amount between the waist region (pelvis) of the occupant and the webbing of the seatbelt device is liable to be smaller than in cases in which the occupant has a large physical build. If the pre-tensioner were to be actuated to move the tongue together with the buckle in a state in which the overlap amount between the waist region (pelvis) of the occupant and the webbing of the seatbelt device is small, the webbing might be moved along the body of the occupant. Such movement of the webbing could cause the worn state of the webbing over the body of the occupant to change, for example by changing the overlap amount between the waist region (pelvis) of the occupant and the webbing of the seatbelt device.

In this vehicle seat system, actuation of the pre-tensioner is restricted by the control device based on the physical build of the occupant seated in the vehicle seat. This enables changes to the worn state of the webbing over the body of the occupant to be suppressed in comparison to cases in which the pre-tensioner is actuated.

A vehicle seat system according to an eighth aspect is the vehicle seat system according to the seventh aspect, wherein the control device restricts actuation of the pre-tensioner in cases in which the physical build of the occupant seated in the vehicle seat is smaller than a predetermined size.

In the vehicle seat system according to the eighth aspect, actuation of the pre-tensioner is restricted by the control device in cases in which the physical build of the occupant seated in the vehicle seat is smaller than the predetermined size.

In cases in which the occupant seated in the vehicle seat has a small physical build, the waist region of the occupant is positioned further toward the vehicle lower side than in cases in which the occupant has a large physical build. Accordingly, in cases in which the occupant seated in the vehicle seat has a small physical build, the webbing is liable to move along the body of the occupant if the waist region of the occupant is lowered together with the seat cushion, making changes to the worn state of the webbing over the body of the occupant more likely.

As described above, in cases in which the physical build of the occupant is smaller than the predetermined size, changes to the worn state of the webbing over the body of an occupant with a small physical build are suppressed by restricting actuation of the pre-tensioner.

A vehicle seat system according to a ninth aspect includes a vehicle seat, a seatbelt device, a pre-tensioner, a sitting state changing device, and a control device. The vehicle seat is provided with a seatback at a vehicle rear side of a seat cushion on which an occupant can sit. The seatbelt device seatbelt device restrains at least the waist region of the occupant using an elongated belt-shaped webbing by retaining a tongue provided to the webbing with a buckle in a state in which the webbing has been passed across the body of the occupant. The pre-tensioner is configured to actuate to move the buckle in order to increase tension of the webbing. The sitting state changing device is configured to actuate such that at least one out of the seat cushion or the seatback is moved so as to change a sitting state, the sitting state being a sitting position of the occupant or a sitting posture of the occupant. The control device is configured to restrict actuation of the pre-tensioner based on a relative positional relationship between the vehicle seat and the buckle.

In the vehicle seat system according to the ninth aspect, the pre-tensioner is actuated in a state in which the webbing of the seatbelt device is being worn over the body of the occupant seated in the vehicle seat, thereby moving the buckle and moving the tongue provided to the webbing together with the buckle. This increases the tension of the webbing, thereby increasing the restraint force on the body of the occupant from the webbing.

In this vehicle seat system, actuation of the sitting state changing device moves at least one out of the seat cushion or the seatback. The sitting state, this being the sitting position or the sitting posture of the occupant in the vehicle seat, is changed by moving the at least one out of the seat cushion or the seatback.

Depending on the sitting state of the occupant seated in the vehicle seat, when the pre-tensioner is actuated and the tongue is moved together with the buckle, the webbing might move along the body of the occupant, thereby changing the worn state of the webbing over the body of the occupant, for example by changing the overlap amount between the waist region (pelvis) of the occupant and the webbing of the seatbelt device.

Note that in this vehicle seat system, the at least one out of the seat cushion or the seatback is moved by actuation of the sitting state changing device, thereby changing the relative positional relationship between the at least one out of the seat cushion or the seatback and the buckle of the seatbelt device. Actuation of the pre-tensioner is restricted by the control device based on the relative positional relationship between the vehicle seat and the buckle.

A vehicle seat system according to a tenth aspect is the vehicle seat system according to the ninth aspect, wherein the seat cushion is capable of being raised or lowered in the vehicle vertical direction by actuation of the sitting state changing device, and the control device is configured to restrict actuation of the pre-tensioner in a state in which the seat cushion is disposed further toward a vehicle lower side than a predetermined position.

In the vehicle seat system according to the tenth aspect, actuating the sitting state changing device raises or lowers the seat cushion of the vehicle seat in the vehicle vertical direction. The sitting position of the occupant in the vehicle seat is changed in the vehicle vertical direction by this raising or lowering of the seat cushion.

For example, in a state in which the buckle of the seatbelt device is disposed further toward the vehicle upper side than the waist region of the occupant, the webbing is liable to move along the body of the occupant due to actuation of the pre-tensioner, such that the worn state of the webbing over the body of the occupant is liable to change. Actuation of the pre-tensioner is thus restricted by the control device in a state in which the seat cushion has been lowered further than the predetermined position.

A vehicle seat system according to an eleventh aspect is the vehicle seat system according to the tenth aspect, wherein a vehicle vertical direction lower limit of the seat cushion at which actuation of the pre-tensioner is permitted by the control device within a raising-lowering range of the seat cushion by the sitting state changing device is set such that a fold-back position of the webbing at the tongue retained by the buckle is at the same vehicle vertical direction position as a hip point of the occupant, or such that the fold-back position is at a position disposed further toward the vehicle lower side than the hip point.

In the vehicle seat system according to the eleventh aspect, actuation of the pre-tensioner is restricted by the control device in cases in which the vehicle vertical direction position of the seat cushion is a position at which the fold-back position of the webbing at the tongue retained by the buckle is higher than the hip point of the occupant.

A vehicle seat system according to a twelfth aspect is the vehicle seat system of any one of the seventh aspect to the eleventh aspect, wherein the seatback is capable of pivoting in a vehicle front-rear direction about a vehicle lower side end portion of the seatback, and the control device is configured to restrict actuation of the pre-tensioner in a state in which the seatback has been pivoted further toward the vehicle rear side than a predetermined angle.

In the vehicle seat system according to the twelfth aspect, the seatback of the vehicle seat is pivoted in the vehicle front-rear direction about the vehicle lower side end portion of the seatback, thereby changing the sitting posture of the occupant in the vehicle seat.

As the tilt angle of the seatback toward the vehicle rear side increases, the tilt toward the vehicle rear side of the waist region of the occupant (in other words the pelvis of the occupant) seated in the vehicle seat also increases. When the tilt of the waist region of the occupant toward the vehicle rear side increases in this manner, the overlap amount between the webbing of the seatbelt device and waist region (pelvis) of the occupant is reduced. In this state, the webbing is liable to move along the body of the occupant when the pre-tensioner is actuated, making changes to the worn state of the webbing over the body of the occupant more likely.

Actuation of the pre-tensioner is restricted by the control device in a state in which the seatback has been pivoted further toward the vehicle rear side than the predetermined angle.

As described above, the vehicle seat system of the first aspect is capable of suppressing changes to the worn state of the webbing over the body of the occupant, for example changes in the overlap amount between the waist region (pelvis) of the occupant and the webbing of the seatbelt device, thereby enabling a reduction in the ability to restrain the body of the occupant using the webbing due to a change in the worn state of the webbing to be suppressed.

The vehicle seat system according to the second aspect enables the waist region of the occupant to be restricted from being lowered together with the seat cushion, enabling the waist region of the occupant to be suppressed from moving further toward the vehicle lower side than the buckle, and thereby enabling a reduction in the ability to restrain the body of the occupant using the webbing to be suppressed.

The vehicle seat system according to the third aspect enables the waist region of an occupant having a small physical build to be suppressed from being disposed further toward the vehicle lower side than the buckle, thereby enabling a reduction in the ability to restrain the body of the occupant using the webbing to be suppressed.

The vehicle seat system according to the fourth aspect enables a reduction in the ability to restrain the body of the occupant using the webbing to be suppressed when the body of the occupant is tilted greatly toward the vehicle rear side.

In the vehicle seat system according to the fifth aspect, in cases in which the seatback has been pivoted further toward the vehicle rear side than the pivot angle of the seatback toward the vehicle rear side corresponding to the lowerable limit value of the seat cushion, the waist region of the occupant is raised together with the seat cushion to at least the lowerable limit value of the seat cushion, thereby enabling a reduction in the ability to restrain the body of the occupant using the webbing to be suppressed.

The vehicle seat system according to the sixth aspect enables the buckle of the seatbelt device to be disposed further toward the vehicle lower side than the waist region of the occupant seated in the vehicle seat, thereby enabling a reduction in the ability to restrain the body of the occupant using the webbing due to lowering of the seat cushion to be suppressed.

In the vehicle seat system according to the seventh aspect, changes to the worn state of the webbing over the body of the occupant are suppressed in comparison to cases in which the pre-tensioner is actuated, enabling a reduction in the ability to restrain the body of the occupant using the webbing due to a change in the worn state of the webbing over the body of the occupant to be suppressed.

In the vehicle seat system according to the eighth aspect, changes to the worn state of the webbing over the body of an occupant having a small physical build can be suppressed, enabling a reduction in the ability to restrain the body of the occupant using the webbing to be suppressed.

In the vehicle seat system according to the ninth aspect, actuation of the pre-tensioner is restricted based on the relative positional relationship between the vehicle seat and the buckle. This enables changes to the worn state of the webbing over the body of the occupant to be suppressed, enabling a reduction in the ability to restrain the body of the occupant using the webbing to be suppressed.

In the vehicle seat system according to the tenth aspect, the worn state of the webbing over the body of the occupant can be suppressed from changing due to actuation of the pre-tensioner in a state in which the seat cushion has been lowered further than the predetermined position, enabling a reduction in the ability to restrain the body of the occupant using the webbing due to a change in the worn state of the webbing to be suppressed.

In the vehicle seat system according to the eleventh aspect, the worn state of the webbing over the body of the occupant can be suppressed from changing due to actuation of the pre-tensioner in a state in which the ability to restrain the body of the occupant using the webbing is reduced, enabling the reduction in the ability to restrain the body of the occupant using the webbing to be suppressed.

In the vehicle seat system according to the twelfth aspect, the worn state of the webbing over the body of the occupant can be suppressed from changing in a state in which the seatback has been pivoted further toward the vehicle rear side than the predetermined angle, enabling a reduction in the ability to restrain the body of the occupant using the webbing to be suppressed.

DETAILED DESCRIPTION

Figure 1:
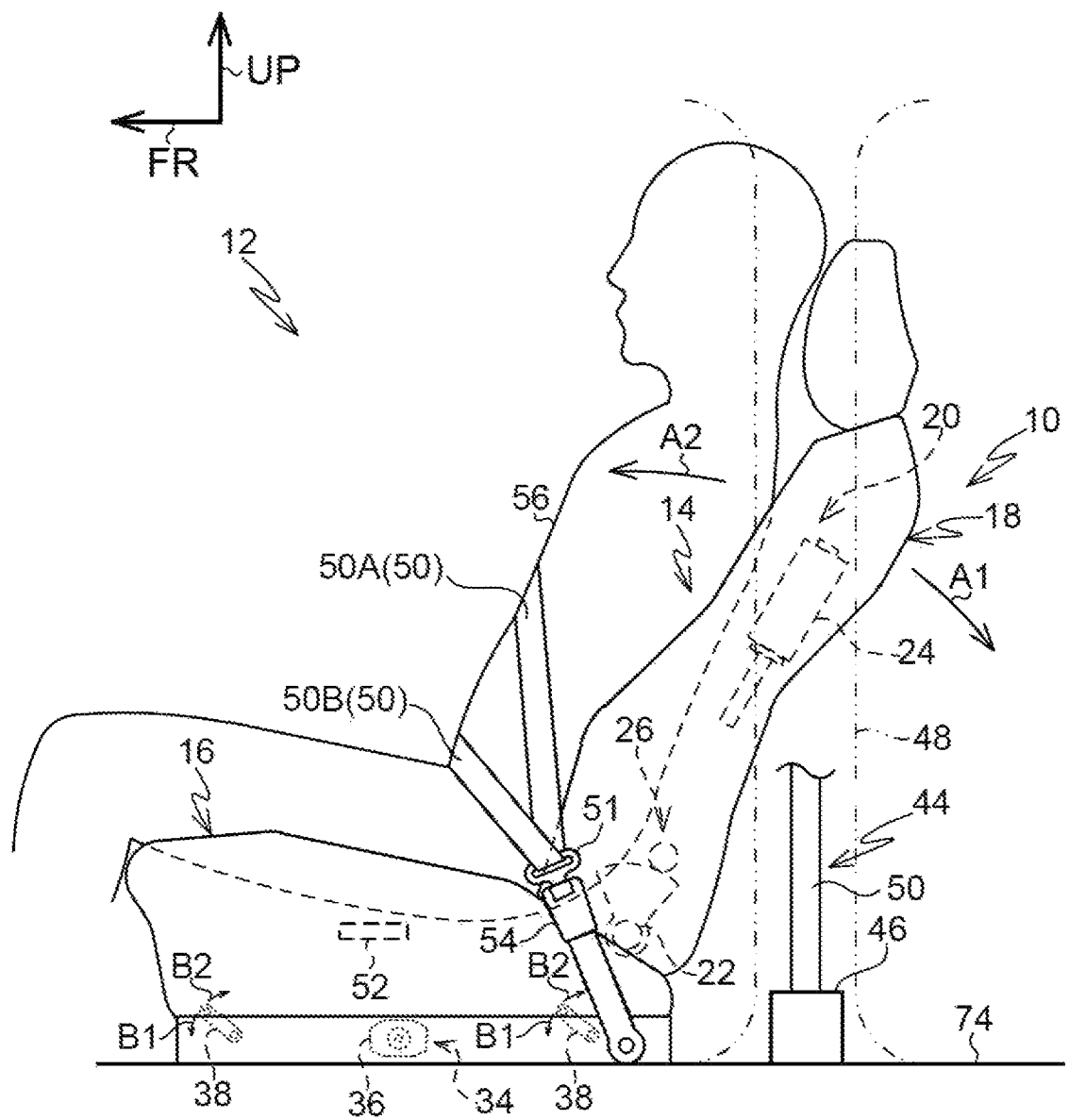
FIG. 1 is a side view illustrating the inside of a vehicle cabin applied with a vehicle seat system according to a first exemplary embodiment, as viewed from the vehicle width direction left side.

Explanation follows regarding exemplary embodiments of the present disclosure, with reference to FIG. 1 to FIG. 13. Note that in each of the drawings, the arrow FR indicates the front side (vehicle front side), the arrow LH indicates the vehicle width direction left side, and the arrow UP indicates the vehicle upper side of a vehicle 12 applied with a vehicle seat system 10.

In the descriptions of later embodiments, configurations that are basically the same as those already described in an earlier exemplary embodiment are allocated the same reference numerals, and detailed description thereof is omitted.

Configuration of First Exemplary Embodiment

As illustrated in FIG. 1, the vehicle seat system 10 according to a first exemplary embodiment includes a vehicle seat 14. The vehicle seat 14 is configured including a seat cushion 16 configuring a seating unit, and a seatback 18 configuring a backrest. The vehicle seat 14 also includes a recliner device 20 serving as a sitting state changing device. The recliner device 20 includes a shaft 22. A center axis direction of the shaft 22 runs along the vehicle width direction, and a vehicle rear side portion of a frame of the seat cushion 16 and a vehicle lower side portion of a frame of the seatback 18 are mechanically coupled together by the shaft 22. The seatback 18 is capable of pivoting in the vehicle front-rear direction (the arrow A1 direction or the opposing arrow A2 direction in FIG. 1) about the shaft 22.

Figure 2:
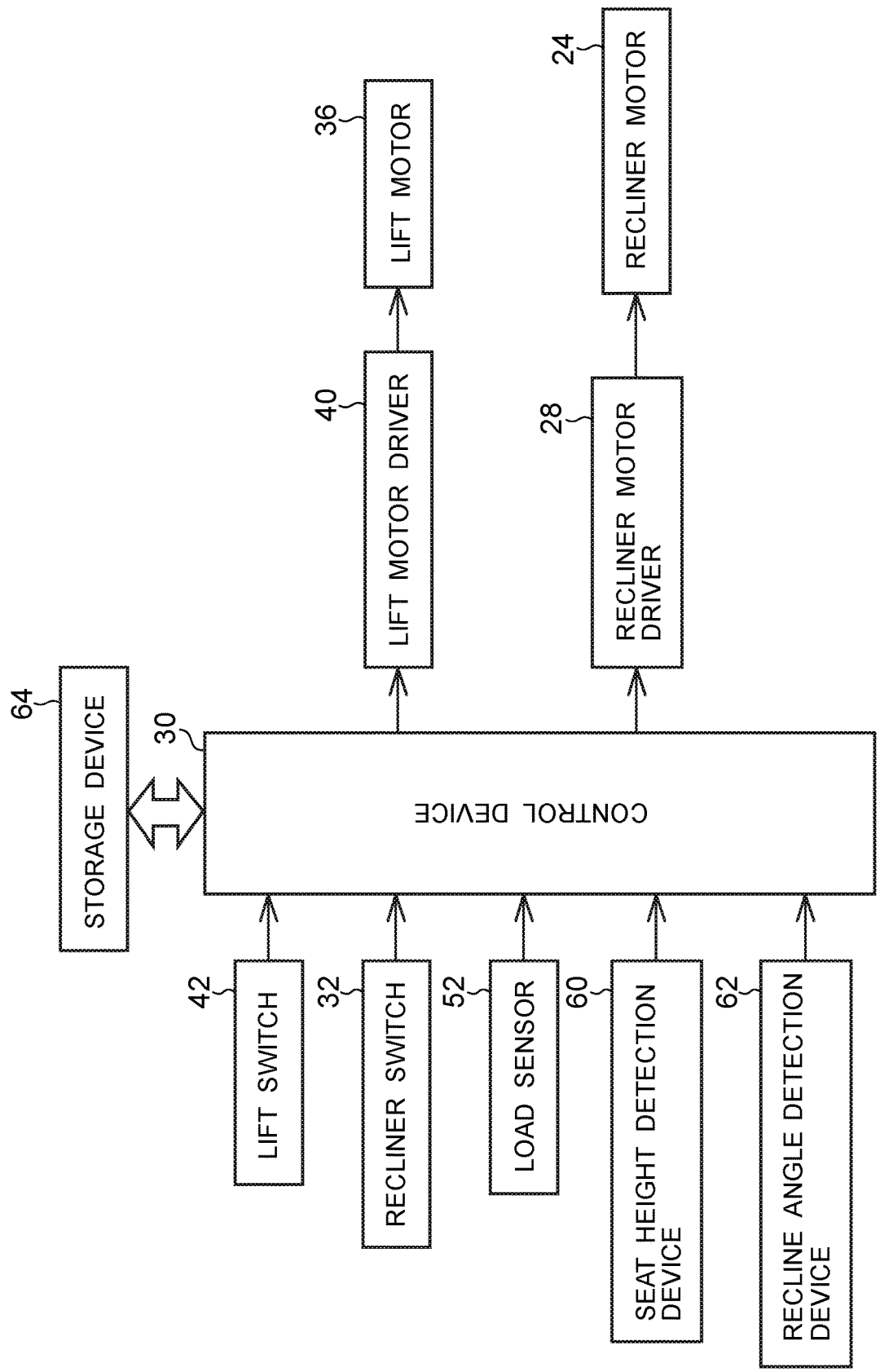
FIG. 2 is a block diagram schematically illustrating a control system of a vehicle seat system according to the first exemplary embodiment.

The recliner device 20 includes a recliner motor 24. The recliner motor 24 is for example provided to the seatback 18. An output shaft of the recliner motor 24 is for example coupled to a gear chain 26, serving as a speed reduction device and a drive force transmission device, provided to the shaft 22. The seatback 18 is pivoted about the shaft 22 by drive force from the recliner motor 24. As illustrated in FIG. 2, the recliner motor 24 is electrically connected to a battery (not illustrated in the drawings) mounted to the vehicle 12, and is also electrically connected to a control device 30, through a recliner motor driver 28.

The control device 30 is electrically connected to a recliner switch 32. When the recliner switch 32 is operated, a recliner operation signal, this being an electrical signal, is output from the recliner switch 32, and the recliner operation signal is input to the control device 30. When the recliner operation signal is input to the control device 30, a recliner drive control signal, this being an electrical signal based on the recliner operation signal, is output from the control device 30. The recliner drive control signal output from the control device 30 is input to the recliner motor driver 28, and the recliner motor driver 28 controls driving of the recliner motor 24 based on the input recliner drive control signal.

As illustrated in FIG. 1, the vehicle seat 14 also includes a lift device 34, serving as a sitting state changing device. The lift device 34 includes a lift motor 36. An output shaft of the lift motor 36 is for example mechanically coupled to links 38, serving as raising-lowering members, through a speed reduction device such as a speed reduction gear chain.

Drive force of the lift motor 36 causes one end portion of each of the links 38 to pivot in a direction (the arrow B1 direction or the opposing arrow B2 direction in FIG. 1) about an axis with an axial direction along the vehicle width direction, and this pivoting causes another end portion of each of the links 38 to pivot in the vehicle vertical direction. The other end portions of the links 38 are mechanically coupled to a cushion support member of the seat cushion 16, such that the seat cushion 16 is raised or lowered by the pivoting of the links 38.

As illustrated in FIG. 2, the lift motor 36 is electrically connected to the control device 30 through a lift motor driver 40. The control device 30 is electrically connected to a lift switch 42. When the lift switch 42 is operated, a lift operation signal, this being an electrical signal, is output from the lift switch 42, and the lift operation signal is input to the control device 30. When the lift operation signal is input to the control device 30, a lift drive control signal, this being an electrical signal based on the lift operation signal, is output from the control device 30. The lift drive control signal output from the control device 30 is input to the lift motor driver 40, and the lift motor driver 40 controls driving of the lift motor 36 based on the input lift drive control signal.

The vehicle seat system 10 also includes a seatbelt device 44. The seatbelt device 44 includes a retractor 46. The retractor 46 is fixed to a vehicle body at the vehicle lower side of a center pillar 48 of the vehicle 12. The retractor 46 includes a take-up shaft (not illustrated in the drawings). A length direction base end portion of an elongated belt-shaped webbing 50 is anchored to the take-up shaft, and the webbing 50 is taken up onto the take-up shaft from a length direction base end side.

A length direction leading end side of the webbing 50 is pulled out toward the vehicle upper side so as to follow the center pillar 48, passed through a slit in a through anchor (not illustrated in the drawings) provided at the vehicle upper side of the retractor 46, and folded back toward the vehicle lower side. A length direction leading end portion of the webbing 50 is anchored to an anchor member (not illustrated in the drawings), and the anchor member is fixed to the vehicle body of the vehicle 12 at the vehicle width direction outer side of the vehicle seat 14. A tongue 51 is provided to a portion of the webbing 50 between the through anchor and the anchor member.

The seatbelt device 44 also includes a buckle 54. The buckle 54 is fixed to a member that is not raised or lowered when the lift device 34 is actuated, such as the vehicle body of the vehicle 12 at the vehicle width direction inner side of the vehicle seat 14, or a seat cushion 16-side movable rail (not illustrated in the drawings) of a sliding device (not illustrated in the drawings) for sliding the vehicle seat 14 along the vehicle front-rear direction. The tongue 51 is capable of engaging with the buckle 54, and the tongue 51 is retained by the buckle 54 when the tongue 51 is engaged with the buckle 54. When the tongue 51 is retained by the buckle 54 in a state in which the webbing 50 has been passed across the body of an occupant 56, the body of the occupant 56 is placed in a restrained state by the webbing 50.

In this restrained state, a portion of the webbing 50 between the through anchor and the tongue 51 configures shoulder webbing 50A, and a region of the body of the occupant 56 from the shoulder on the vehicle width direction outer side to the vicinity of the stomach region is restrained by the shoulder webbing 50A. Moreover, in this restrained state, a portion of the webbing 50 between the tongue 51 and the anchor member configures lap webbing 50B. The lap webbing 50B restrains the waist region (the pelvis 56A, see FIG. 6A) of the body of the occupant 56 from the vehicle upper-front side.

As illustrated in FIG. 2, the control device 30 described above is electrically connected to a load sensor 52, serving as a physical build detection device. As illustrated in FIG. 1, the load sensor 52 is for example provided to the seat cushion 16 of the vehicle seat 14, and detects load acting on the seat cushion 16 from the vehicle upper side. A load detection signal is output from the load sensor 52 based on the size of the load acting on the seat cushion 16. The load detection signal output from the load sensor 52 is input to the control device 30. The control device 30 determines whether or not the physical build of the occupant 56 seated in the vehicle seat 14 is smaller than a predetermined size based on the input load detection signal.

As illustrated in FIG. 2, the control device 30 is also electrically connected to a seat height detection device 60. The seat height detection device 60 is for example configured by a rotary encoder that detects a rotation position of the output shaft of the lift motor 36. As previously described, drive force from the lift motor 36 is transmitted to the links 38, and the seat cushion 16 is raised or lowered by pivoting of the links 38. A vehicle vertical direction position (height) of the seat cushion 16 can therefore be indirectly detected by detecting the rotation position of the output shaft of the lift motor 36.

A seat height detection signal, this being an electrical signal corresponding to the rotation position of the output shaft of the lift motor 36 (namely, the height of the seat cushion 16), is output from the seat height detection device 60. The seat height detection signal output from the seat height detection device 60 is input to the control device 30.

The control device 30 is also electrically connected to a recline angle detection device 62. The recline angle detection device 62 is for example a rotary encoder that detects a rotation position of the output shaft of the recliner motor 24. As previously described, the seatback 18 is pivoted in the vehicle front-rear direction by drive force from the recliner motor 24. A vehicle front-rear direction pivot angle of the seatback 18 can therefore be indirectly detected by detecting the rotation position of the output shaft of the recliner motor 24.

A recline angle detection signal, this being an electrical signal corresponding to the rotation position of the output shaft of the recliner motor 24 (namely, the pivot angle of the seatback 18), is output from the recline angle detection device 62. The recline angle detection signal output from the recline angle detection device 62 is input to the control device 30.

The control device 30 is also electrically connected to a storage device 64. Data regarding a raising-lowering restriction range of the seat cushion 16 corresponding to the recline angle, this being the pivot angle of the seatback 18 toward the vehicle rear side, is stored in the storage device 64.

Figure 3:
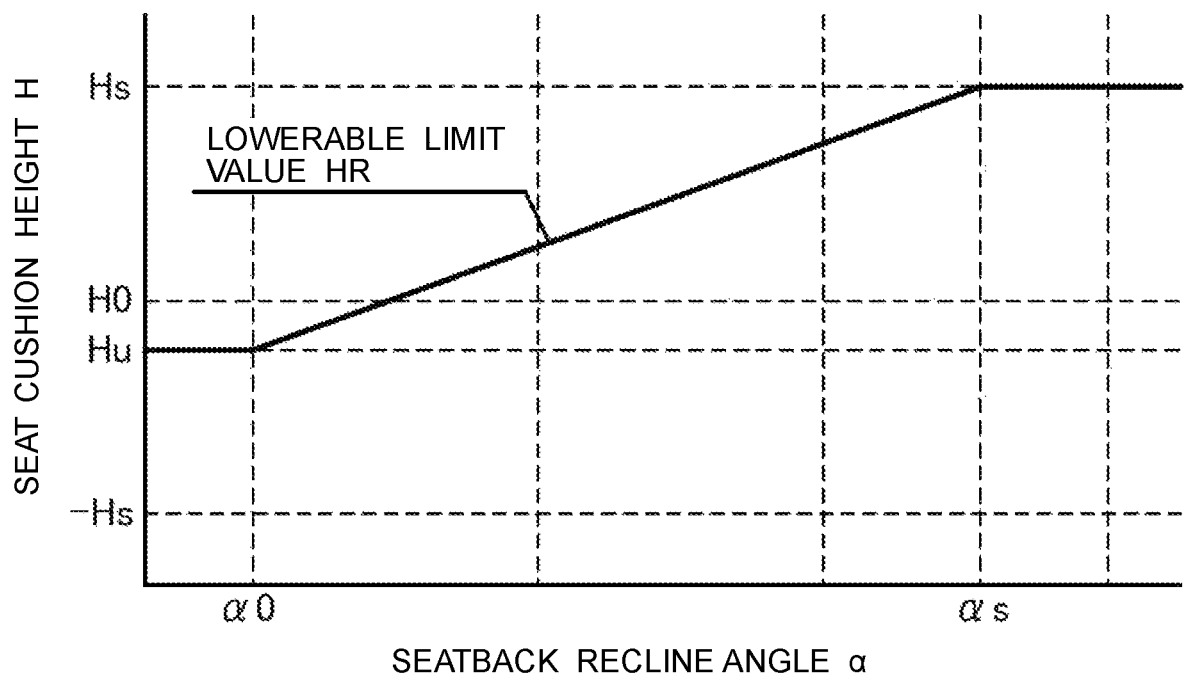
FIG. 3 is a graph illustrating a relationship between a recline angle of a seatback and a lowerable limit value of a seat cushion by a lift device in a vehicle seat system according to the first exemplary embodiment.
Figure 4:
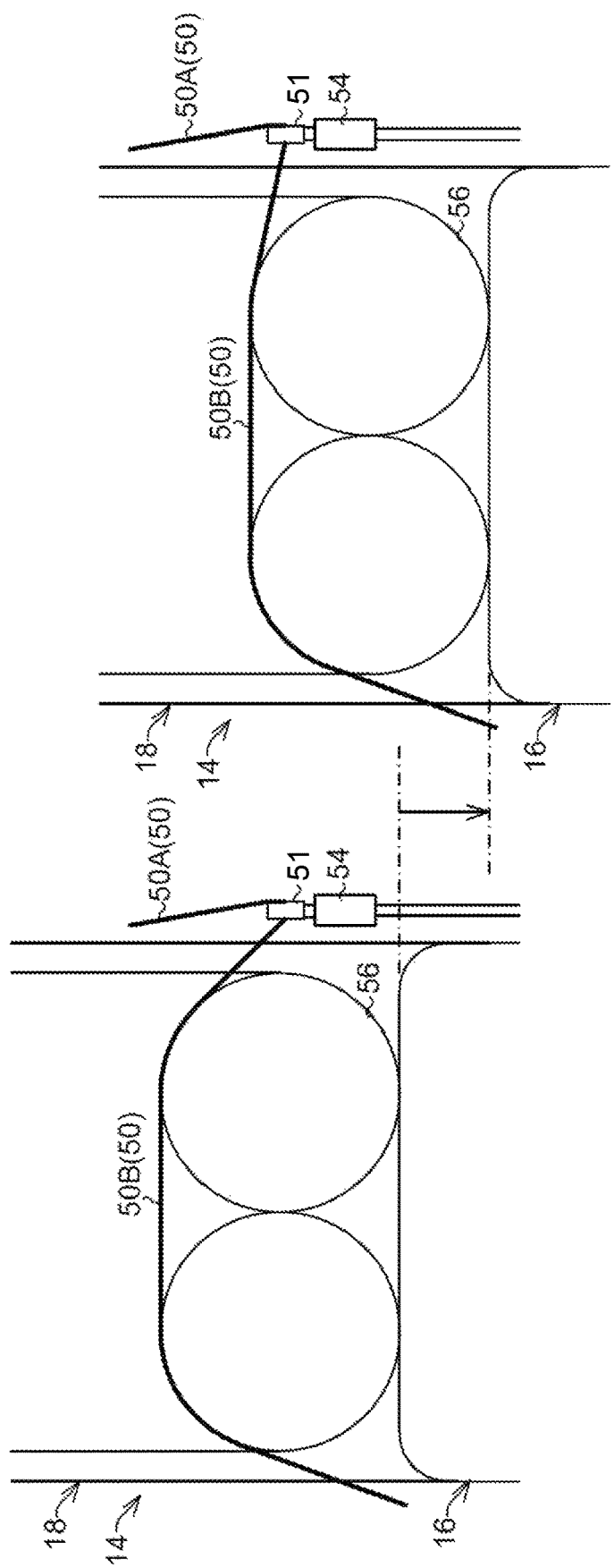
FIG. 4 is a face-on view illustrating, in part (A), a positional relationship between the body of an occupant and a buckle prior to a seat cushion being lowered, and in part (B), a positional relationship between the body of an occupant and a buckle in a state in which a seat cushion has been lowered.
Figure 5:
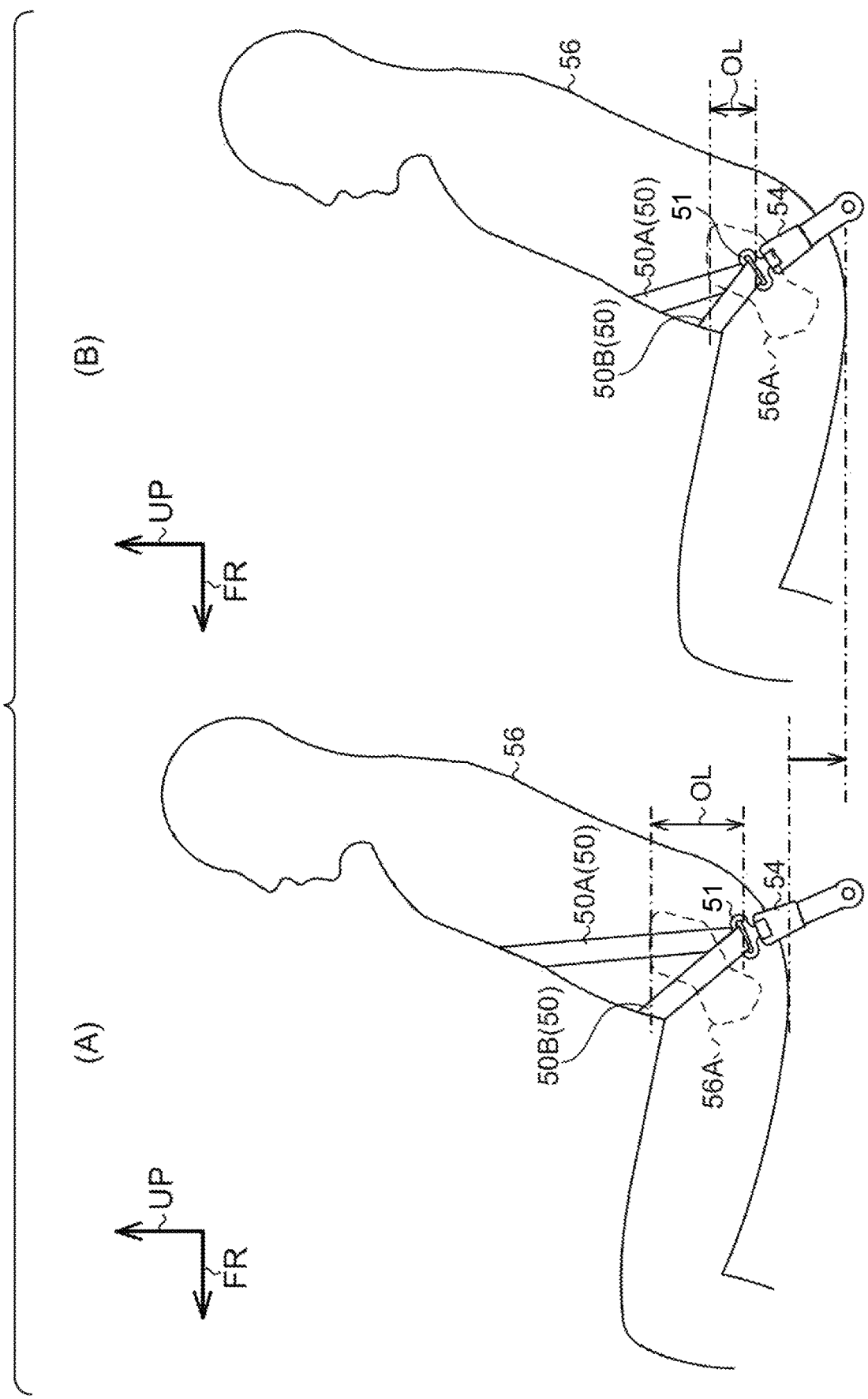
FIG. 5 is a side view illustrating, in part (A), a positional relationship between the body of an occupant and a buckle prior to a seat cushion being lowered, and in part (B), a positional relationship between the body of an occupant and a buckle and a change in an overlap amount of a lap webbing in a state in which a seat cushion has been lowered.
Figure 6:
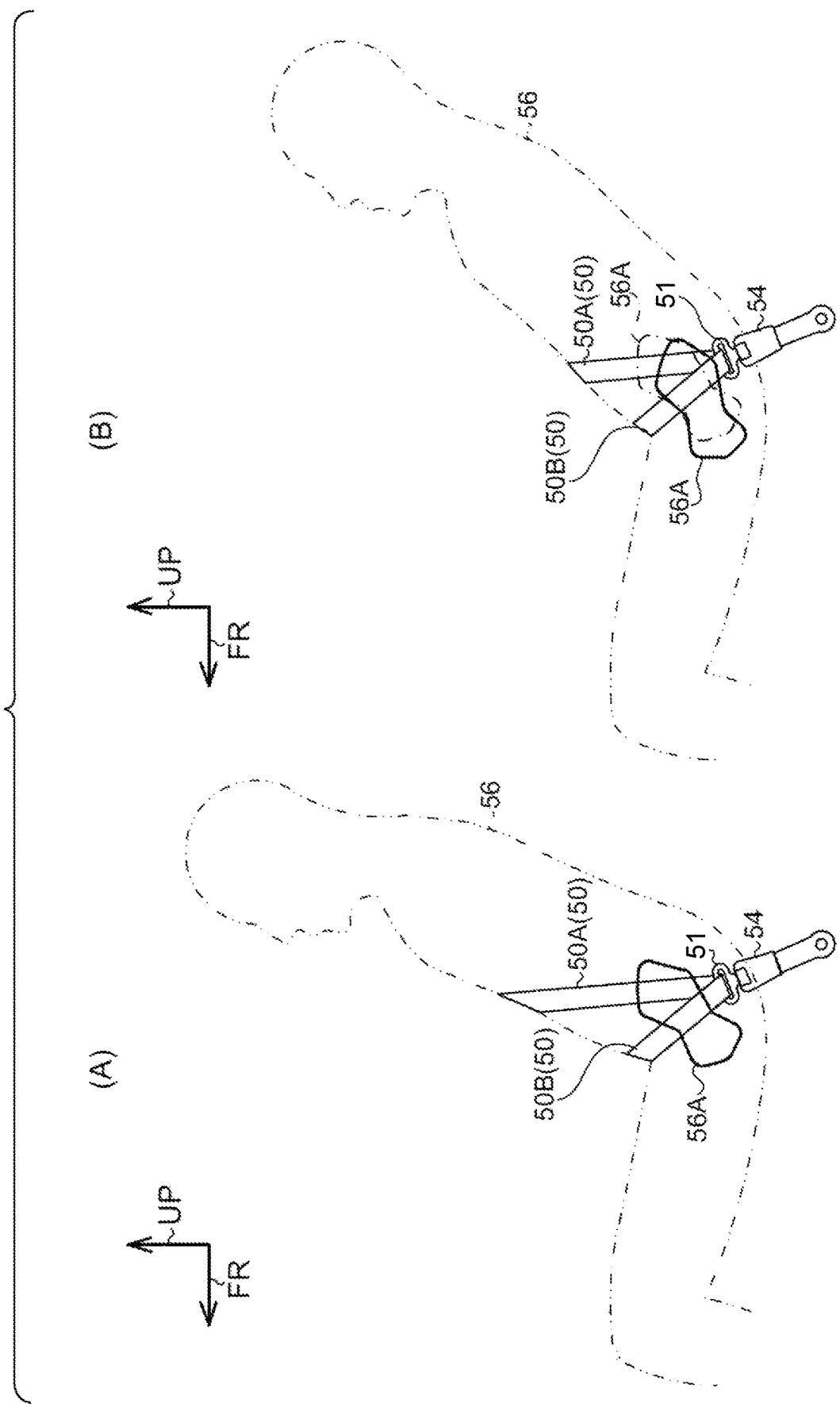
FIG. 6 is a side view illustrating, in part (A), a state of the pelvis of an occupant and a state of a lap webbing when a recline angle is small, and in part (B), a state of the pelvis of an occupant and a state of a lap webbing when a recline angle is large.

FIG. 3 is a graph illustrating a relationship between the recline angle $\alpha$ of the seatback 18, the height H of the seat cushion 16, and lowerable limit values for the seat cushion 16 when lowered toward the vehicle lower side by the lift device 34. In the graph, a height Hs of the seat cushion 16 represents an upper limit value of a movable range of the seat cushion 16 toward the vehicle upper side by the lift device 34. A height −Hs of the seat cushion 16 represents a lower limit value of the movable range of the seat cushion 16 toward the vehicle lower side by the lift device 34.

A height H0 of the seat cushion 16 represents a center of the movable range of the seat cushion 16. Namely, the height H0 is centered between the height Hs and the height −Hs, and represents a standard height of the seat cushion 16. For example, the height Hs is a height 30 mm further toward the vehicle upper side than the standard height H0, and the height −Hs is a height 30 mm further toward the vehicle lower side than the standard height H0.

The solid line HR in the graph in FIG. 3 represents a lowerable limit value. As previously described, the seat cushion 16 is raised or lowered in the vehicle vertical direction by drive force of the lift motor 36 of the lift device 34. However, when the lift motor 36 is controlled based on the data regarding the raising-lowering restriction range of the seat cushion 16, lowering of the seat cushion 16 is restricted by the lowerable limit value represented by the solid line HR in the graph in FIG. 3 (namely, a raising-lowering range of the seat cushion 16 lies between the lowerable limit value and the upper limit value Hs).

In the present exemplary embodiment, in a standard angle range in which the recline angle of the seatback 18 is a standard angle $\alpha 0$ (such as 20°) or lower, the lowerable limit value is a constant height Hu lying between the height −Hs and the height H0. In a state in which the recline angle of the seatback 18 is within this standard range and the height of the seat cushion 16 is set to the height Hu, a fold-back position of the webbing 50 at the tongue 51 retained by the buckle 54 of the seatbelt device 44 (the fold-back position of the webbing 50 at the tongue 51 retained by the buckle 54 is hereafter referred to as the "webbing fold-back position at the tongue 51") is set so as to be at the same vehicle vertical direction position as a hip point of a human dummy seated in the vehicle seat 14, or to be at the vehicle lower side of the hip point. The human dummy employed in this case is for example a human dummy equivalent to an adult female in the 5$^{th}$ percentile (height 145 cm, weight 45 kg) (AF05).

When the recline angle of the seatback 18 is greater than the angle $\alpha 0$, the lowerable limit value increases proportionately to increase in the recline angle, reducing the lowerable range of the seat cushion 16 by the lift device 34. When the recline angle of the seatback 18 reaches or exceeds an angle $\alpha s$, the lowerable limit value is the same as the upper limit value Hs of the seat cushion 16 by the lift device 34. Namely, in this state the height of the seat cushion 16 is retained at the upper limit value.

In the present exemplary embodiment, the lowerable limit value of the seat cushion 16 by the lift device 34 is set in the above manner.

Operation and Advantageous Effects of First Exemplary Embodiment

Explanation follows regarding operation and advantageous effects of the vehicle seat system 10 according to the present exemplary embodiment.

In the vehicle seat system 10, when the recliner switch 32 is operated by the occupant 56 seated in the vehicle seat 14, a recliner operation signal output from the recliner switch 32 is input to the control device 30. The control device 30 outputs a recliner drive control signal based on the input recliner operation signal, and the recliner drive control signal is input to the recliner motor driver 28. The recliner motor driver 28 drives the recliner motor 24 based on the recliner drive control signal, thereby pivoting the seatback 18 in the vehicle front-rear direction.

Moreover, when the lift switch 42 is operated by the occupant 56 seated in the vehicle seat 14, a lift operation signal output from the lift switch 42 is input to the control device 30. The control device 30 outputs a lifting drive control signal based on the input lift operation signal, and the lifting drive control signal is input to the lift motor driver 40. The lift motor driver 40 drives the lift motor 36 based on the lifting drive control signal, thereby raising or lowering the seat cushion 16 in the vehicle vertical direction.

Furthermore, when the occupant 56 sits on the vehicle seat 14, a load is detected by the load sensor 52 based on the weight of the occupant 56, and a load detection signal corresponding to the size of the load is output from the load sensor 52. The load detection signal output from the load sensor 52 is input to the control device 30. The control device 30 determines whether or not the size of the load is smaller than a set load preset in the control device 30, namely, whether or not the physical build of the occupant 56 is smaller than a predetermined size, based on the input load detection signal. Since the occupant 56 has a small build, the control device 30 determines that the physical build of the occupant 56 is smaller than the predetermined size, whereupon the control device 30 reads the lowerable limit value of the seat cushion 16 corresponding to the recline angle of the seatback 18 (the pivot angle of the seatback 18 toward the vehicle rear side) in this state from the storage device 64.

In this state, if the lift switch 42 is operated by the occupant 56 until the seat cushion 16 is lowered as far as the lowerable limit value, driving of the lift motor 36 is halted by the control device 30 such that the seat cushion 16 is not lowered any further.

As illustrated in FIG. 4A and FIG. 4B, in cases in which the occupant 56 has a small build, if the seat cushion 16 is lowered by a large amount, the relative height of the buckle 54 is raised. The webbing fold-back position at the tongue 51 might for example be disposed at the vehicle upper side of a hip point of the occupant 56 as a result. As illustrated in FIG. 5A and FIG. 5B, when the webbing fold-back position at the tongue 51 is disposed at the vehicle upper side of the hip point of the occupant 56, an overlap amount OL between the waist region of the occupant 56 and the lap webbing 50B might decrease.

However, in the present exemplary embodiment, in cases in which the physical build of the occupant 56 is smaller than the predetermined size, namely, in cases in which the occupant 56 has a small build, the seat cushion 16 is not moved further toward the vehicle lower side than the lowerable limit value. If, for example, the recline angle of the seatback 18 is within the standard angle range (the angle $\alpha 0$ or less) in this state, the webbing fold-back position at the tongue 51 is disposed at the same vehicle vertical direction position as the hip point of the above-described human dummy, or further toward the vehicle lower side than the hip point.

This can suppress the webbing fold-back position at the tongue 51 from being disposed further toward the vehicle upper side than the hip point of the occupant 56, and enables a reduction in the overlap amount OL between the pelvis 56A (waist region) of the occupant 56 and the lap webbing 50B to be suppressed. Thus, a reduction in the ability to restrain the body of the occupant 56 using the webbing 50, and in particular the lap webbing 50B, can be suppressed. Thus, for example, in a frontal collision of the vehicle, the occurrence of what is known as the "submarining phenomenon", in which the upper body of the occupant 56 slips under the vehicle lower side of the lap webbing 50B and moves toward the vehicle front side, as well as movement of the lap webbing 50B from the waist region to the stomach region of the occupant 56, can be suppressed.

Moreover, if the recliner switch 32 is operated by the occupant 56 and the seatback 18 is pivoted toward the vehicle rear side while in this state, the lowerable limit value of the seat cushion 16 corresponding to the recline angle of the seatback 18 after being pivoted is read from the storage device 64. The control device 30 then compares the new lowerable limit value read by the control device 30 against the height of the seat cushion 16 based on the seat height detection signal output from the seat height detection device 60. In cases in which the control device 30 determines that the height of the seat cushion 16 is lower than the lowerable limit value, the control device 30 drives the lift motor 36 to raise the seat cushion 16 until the height of the seat cushion 16 is the same as the lowerable limit value, or to a predetermined position that is higher than the lowerable limit value.

As illustrated in FIG. 6A and FIG. 6B, when the upper body of the occupant 56 seated in the vehicle seat 14 tilts toward the vehicle rear side, the pelvis 56A of the occupant 56 also tilts toward the vehicle rear side. When the pelvis 56A of the occupant 56 tilts toward the vehicle rear side in this manner, the overlap amount OL between the pelvis 56A (waist region) of the occupant 56 and the lap webbing 50B might be reduced.

In the present exemplary embodiment, when the recline angle of the seatback 18 is greater than the angle $\alpha 0$, the lowerable limit value increases so as to reduce the lowerable range of the seat cushion 16 by the lift device 34. This suppresses the webbing fold-back position at the tongue 51 from rising relative to the seat cushion 16 as the recline angle of the seatback 18 increases. This enables the webbing fold-back position at the tongue 51 to be suppressed from nearing the hip point of the occupant 56 or from moving further toward the vehicle upper side than the hip point relative to the hip point.

This enables a reduction in the overlap amount OL between the pelvis 56A (waist region) of the occupant 56 and the lap webbing 50B to be suppressed. This enables a reduction in the ability to restrain the body of the occupant 56 using the webbing 50, and in particular the lap webbing 50B, to be suppressed, even for example in cases in which the occupant 56 is seated in the vehicle seat 14 in a relaxed posture with the seatback 18 at a large recline angle during self-driving of the vehicle.

Thus, in the present exemplary embodiment, in cases in which the occupant 56 has a small build, a reduction in the ability to restrain the body of the occupant 56 using the webbing 50 can be suppressed, even if the seatback 18 pivots toward the vehicle rear side or the sitting position of the occupant 56 in the vehicle seat 14 changes with respect to the vehicle vertical direction. Thus, for example, movement of the lap webbing 50B from the waist region toward the stomach region of the occupant 56 in a frontal collision of the vehicle can be suppressed.

Second Exemplary Embodiment

Figure 7:
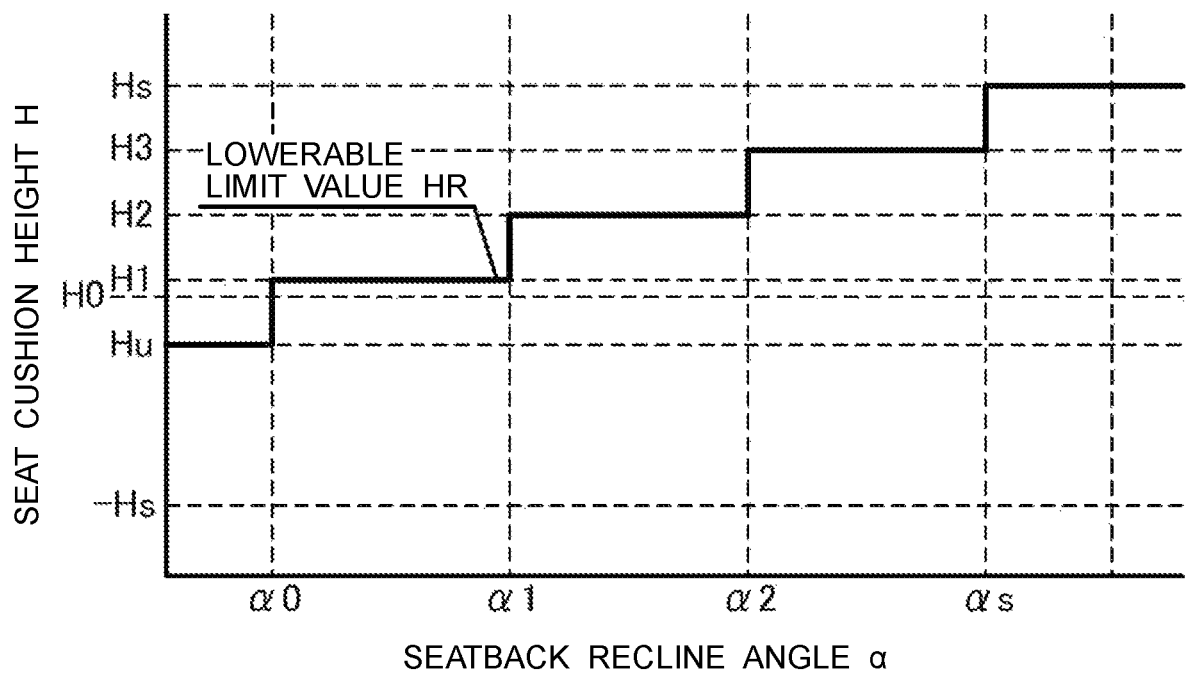
FIG. 7 is a graph illustrating a relationship between a recline angle of a seatback and a lowerable limit value of a seat cushion by a lift device in a vehicle seat system according to a second exemplary embodiment.

As illustrated in FIG. 3, in the first exemplary embodiment, when the recline angle of the seatback 18 is greater than the angle $\alpha 0$, the lowerable limit value increases proportionately to increase in the recline angle such that the lowerable range of the seat cushion 16 by the lift device 34 is reduced. In contrast thereto, as illustrated in FIG. 7, in a second exemplary embodiment, when the recline angle of the seatback 18 is greater than the angle $\alpha 0$, the lowerable limit value increases incrementally accompanying increase in the recline angle.

Namely, in the present exemplary embodiment, when the recline angle is the angle $\alpha 0$ or greater but less than an angle α1, the lowerable limit value is set to a height H1, and when the recline angle is the angle α1 or greater but less than an angle α2, the lowerable limit value is set to a height H2. When the recline angle is the angle α2 or greater but less than an angle αs, the lowerable limit value is set to a height H3, and when the recline angle is the angle αs or greater, the lowerable limit value is set to the upper limit value Hs for raising of the seat cushion 16 by the lift device 34, similarly to in the first exemplary embodiment.

Thus, in the present exemplary embodiment, the lowerable limit value of the seat cushion 16 does not change within predetermined ranges of the recline angle of the seatback 18. Thus, even in a state in which that seat cushion 16 has been lowered as far as the lowerable limit value, as long as the recline angle of the seatback 18 is changed within a predetermined range, the lift motor 36 is not actuated and the seat cushion 16 is not raised.

This can suppress annoyance felt by the occupant 56 due to the lift motor 36 being actuated by the control device 30 so as to raise the seat cushion 16 every time the occupant 56 pivots the seatback 18 toward the vehicle rear side. Furthermore, since the lowerable limit value of the seat cushion 16 is not changed and the lift motor 36 is not actuated when the recline angle of the seatback 18 is changed within a predetermined range, battery consumption by the lift motor 36 can be suppressed.

Configuration of Third Exemplary Embodiment

Figure 8:
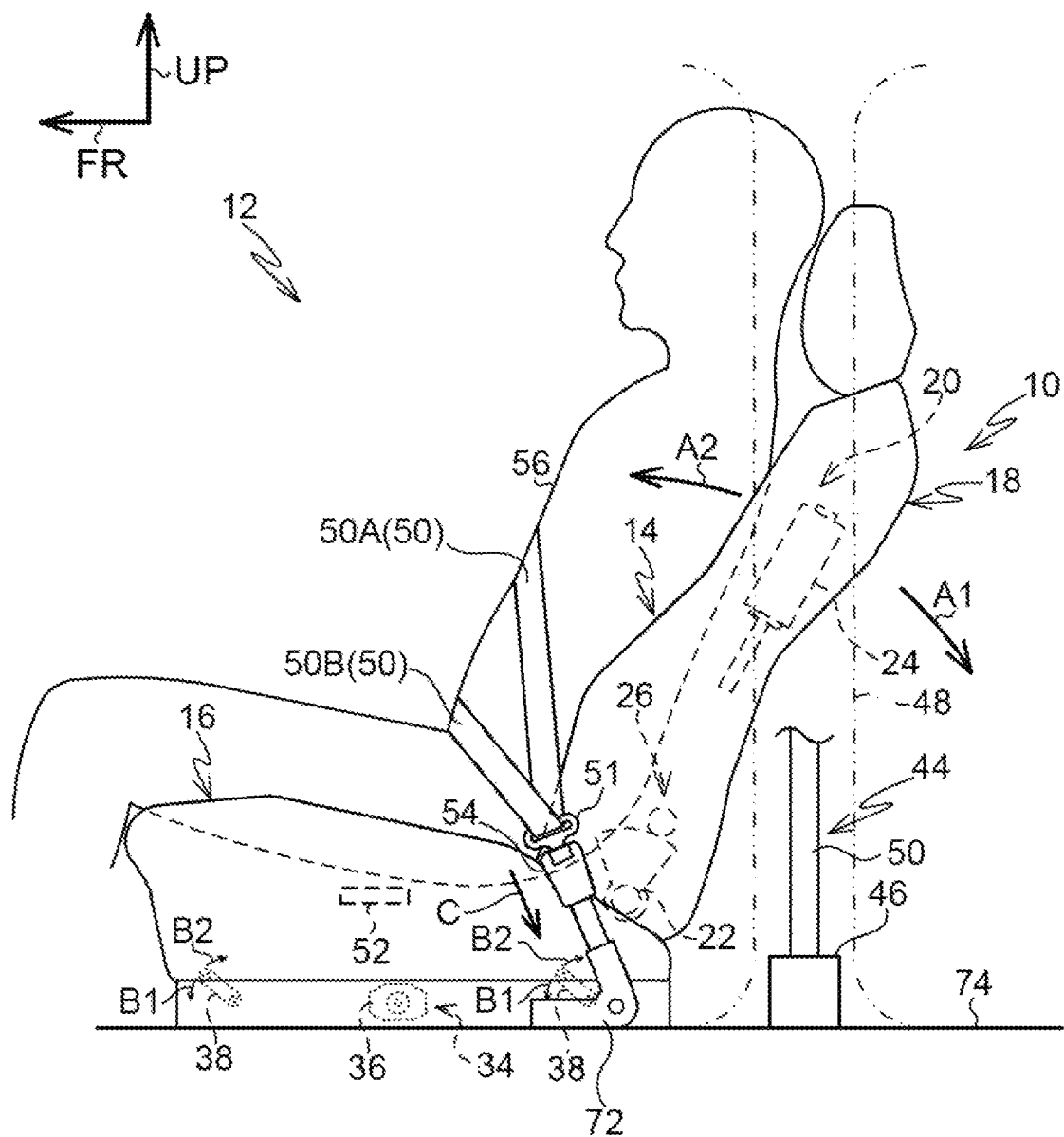
FIG. 8 is a side view illustrating the inside of a vehicle cabin applied with a vehicle seat system according to a third exemplary embodiment, as viewed from the vehicle width direction left side.

As illustrated in FIG. 8, in a third exemplary embodiment, the seatbelt device 44 includes a pre-tensioner 72. The pre-tensioner 72 is disposed on a vehicle floor 74 at the vehicle width direction center side of the vehicle seat 14, and is fixed to a framework member, a high-strength member, or the like configuring the vehicle body of the vehicle. The pre-tensioner 72 is mechanically coupled to the buckle 54. When the pre-tensioner 72 is actuated, the buckle 54 is pulled and moved toward the oblique vehicle lower-rear side (the arrow C direction in FIG. 8) by the pre-tensioner 72.

Figure 9:
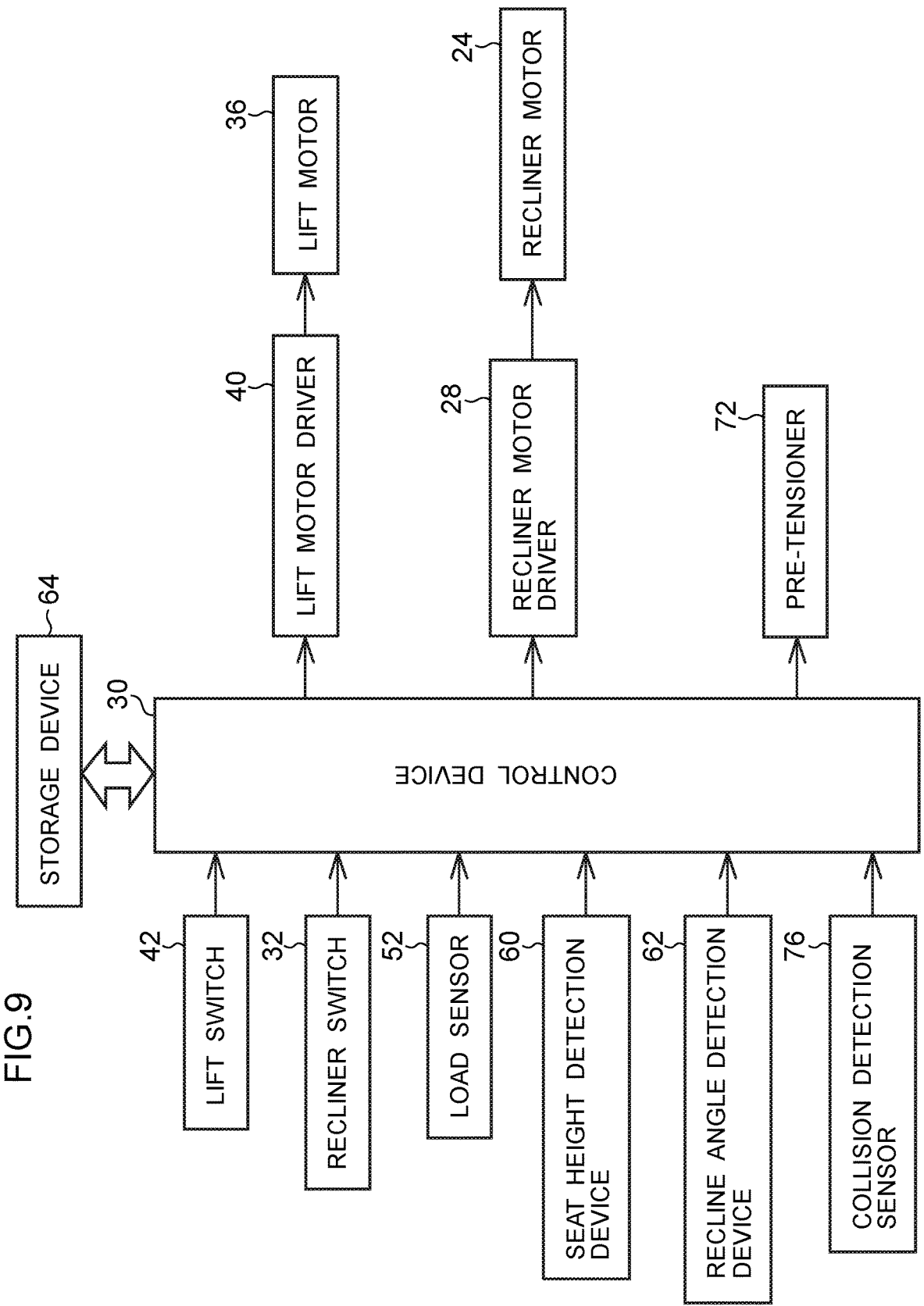
FIG. 9 is a block diagram schematically illustrating a control system of a vehicle seat system according to the third exemplary embodiment.

As illustrated in FIG. 9, the pre-tensioner 72 is electrically connected to the control device 30, and a pre-tensioner actuation signal output from the control device 30 is input to the pre-tensioner 72. Furthermore, in the present exemplary embodiment, the control device 30 is electrically connected to a collision detection sensor 76. The collision detection sensor 76 is for example provided at a vehicle front side end portion of the vehicle, and detects acceleration (deceleration) of the vehicle 12 when the vehicle 12 collides with an obstacle. When the collision detection sensor 76 detects acceleration of the vehicle 12 in a collision such as a frontal collision of the vehicle 12, the collision detection sensor 76 outputs a collision detection signal, this being an electrical signal.

When the collision detection signal output from the collision detection sensor 76 is input to the control device 30, the control device 30 outputs a pre-tensioner actuation signal in order to actuate the pre-tensioner 72. The buckle 54 thereby is pulled and moved toward the oblique vehicle lower-rear side by the pre-tensioner 72 in a vehicle collision. When the buckle 54 is moved by the pre-tensioner 72 in this manner, tension of the webbing 50, namely, tension of the shoulder webbing 50A and the lap webbing 50B, increases, enabling the restraint force on the body of the occupant 56 from the webbing 50 to be increased.

In the present exemplary embodiment, data regarding actuation limits of the pre-tensioner 72 corresponding to recline angles of the seatback 18 and heights of the seat cushion 16 is stored in the storage device 64.

Figure 10:
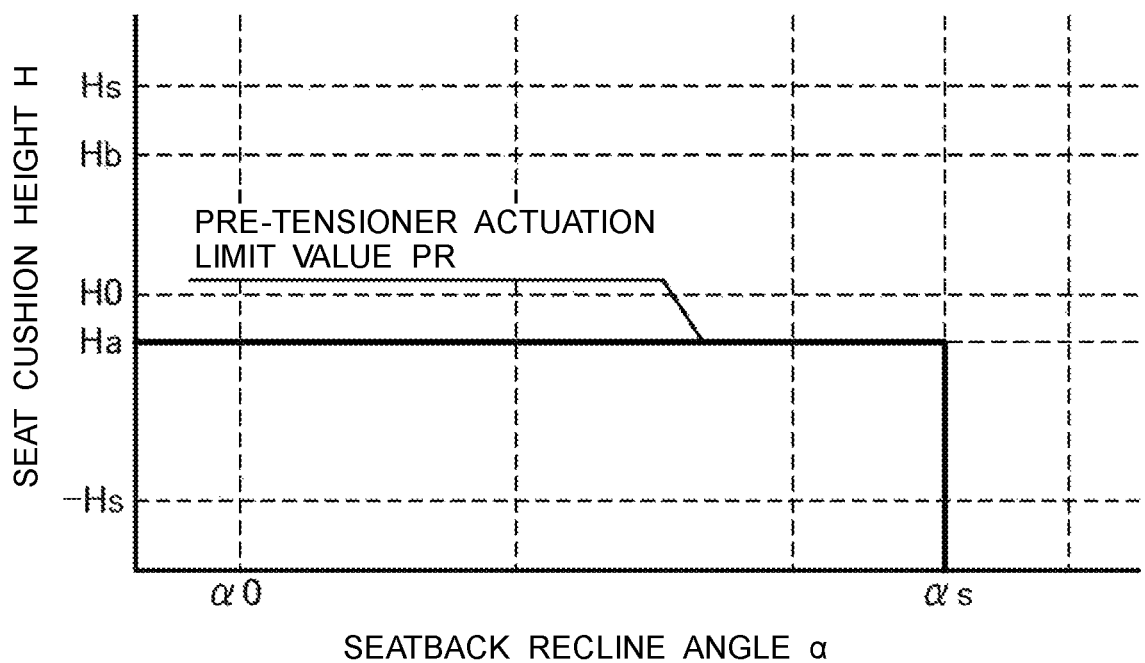
FIG. 10 is a graph illustrating a relationship between a recline angle of a seatback and a lower limit value for lowering of a seat cushion by a lift device at which actuation of a pre-tensioner is prohibited in cases in which the physical build of an occupant is smaller than a predetermined size, in a vehicle seat system according to the third exemplary embodiment.
Figure 11:
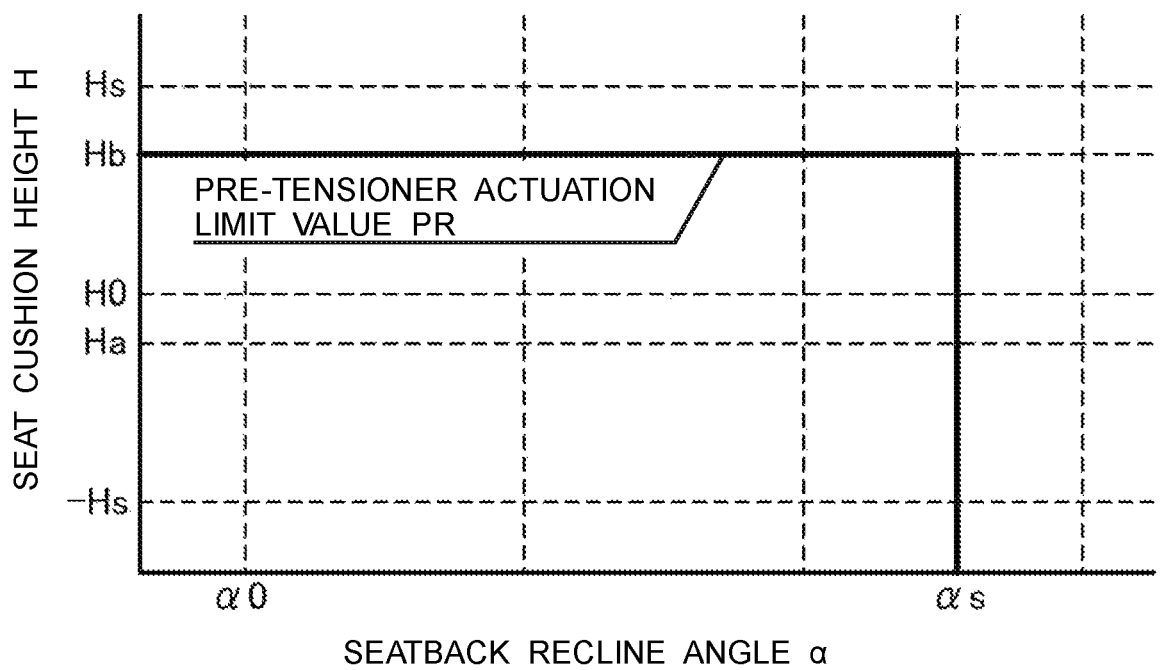
FIG. 11 is a graph illustrating a relationship between a recline angle of a seatback and a lower limit value for lowering of a seat cushion by a lift device at which actuation of a pre-tensioner is prohibited in cases in which the physical build of an occupant is a predetermined size or larger, in a vehicle seat system according to the third exemplary embodiment.

FIG. 10 is a graph illustrating a relationship between the recline angle α of the seatback 18, the height H of the seat cushion 16, and the actuation limit of the pre-tensioner 72 in cases in which the physical build of the occupant 56 is smaller than a predetermined size. FIG. 11 is a graph illustrating a relationship between the recline angle α of the seatback 18, the height H of the seat cushion 16, and the actuation limit of the pre-tensioner 72 in cases in which the physical build of the occupant 56 is the predetermined size or larger.

In these graphs, the solid line PR represents a pre-tensioner actuation limit value. A range at the lower side of the solid line PR in the graphs represents a pre-tensioner actuation enabled range. Namely, in cases in which the physical build of the occupant 56 is smaller than the predetermined size, if the recline angle of the seatback 18 is less than the angle αs and the height of the seat cushion 16 is lower than a height Ha, then the pre-tensioner 72 is able to be actuated.

Note that the height Ha is set lower than the height H0. More specifically, the height Ha is set such that, in a state in which the recline angle of the seatback 18 is within the standard range described above, the webbing fold-back position at the tongue 51 is at the same vehicle vertical direction position as the hip point of a human dummy seated in the vehicle seat 14, or is further toward the vehicle lower side than the hip point. The human dummy employed in this case is a human dummy equivalent to an adult female in the $5^{th}$ percentile (height 145 cm, weight 45 kg) (AF05).

On the other hand, in cases in which physical build of the occupant 56 is the predetermined size or larger, if the recline angle of the seatback 18 is less than the angle αs and the height of the seat cushion 16 is lower than a height Hb (the height Hb being higher than the height H0), then the pre-tensioner 72 is able to be actuated.

Note that the height Hb is set higher than the height H0. More specifically, the height Hb is set such that, in a state in which the recline angle of the seatback 18 is within the standard range described above, the webbing fold-back position at the tongue 51 is at the same vehicle vertical direction position as the hip point of a human dummy seated in the vehicle seat 14, or is further toward the vehicle lower side than the hip point. The human dummy employed in this case is for example a human dummy equivalent to an adult male in the $50^{th}$ percentile (height 175 cm, weight 78 kg) (AM50).

Ranges outside the pre-tensioner actuation enabled ranges in the graphs configure pre-tensioner actuation prohibited ranges (actuation restricted ranges). The control device 30 determines whether or not the recline angle of the seatback 18 and the height of the seat cushion 16 are within a pre-tensioner actuation prohibited range based on the recline angle detection signal output from the recline angle detection device 62 and the seat height detection signal output from the seat height detection device 60 illustrated in FIG. 9. If the control device 30 determines that the recline angle of the seatback 18 and the height of the seat cushion 16 are within the pre-tensioner actuation prohibited range, the control device 30 does not output a pre-tensioner actuation signal to actuate the pre-tensioner 72 even if a collision detection signal output from the collision detection sensor 76 is input to the control device 30.

Operation and Advantageous Effects of Third Exemplary Embodiment

In the present exemplary embodiment, the control device 30 determines whether or not the physical build of the occupant 56 is smaller than the predetermined size based on the load detection signal output from the load sensor 52 in a state in which the occupant 56 is seated in the vehicle seat 14. The recline angle detection signal output from the recline angle detection device 62 and the seat height detection signal output from the seat height detection device 60 are also input to the control device 30.

If the control device 30 determines that the physical build of the occupant 56 seated in the vehicle seat 14 is smaller than the predetermined size based on the load detection signal input to the control device 30, the control device 30 reads the data regarding the actuation limit of the pre-tensioner 72 corresponding to the recline angle of the seatback 18, based on the recline angle detection signal input to the control device 30. After reading the data regarding the actuation limit of the pre-tensioner 72, the control device 30 compares the height of the seat cushion 16, based on the seat height detection signal input to the control device 30, against the data regarding the actuation limit of the pre-tensioner 72 read by the control device 30.

In cases in which the control device 30 determines that the recline angle of the seatback 18 is less than the angle αs and the height of the seat cushion 16 is the height Ha or greater, and in cases in which the control device 30 determines that the recline angle of the seatback 18 is the angle αs or greater, the control device 30 does not actuate the pre-tensioner 72, even if a collision detection signal output from the collision detection sensor 76 is input to the control device 30 in a vehicle collision.

If the control device 30 determines that the physical build of the occupant 56 seated in the vehicle seat 14 is the predetermined size or larger based on the load detection signal input to the control device 30, the control device 30 reads the data regarding the actuation limit of the pre-tensioner 72 corresponding to the recline angle of the seatback 18, based on the recline angle detection signal input to the control device 30. After reading the data regarding the actuation limit of the pre-tensioner 72, the control device 30 compares the height of the seat cushion 16, based on the seat height detection signal input to the control device 30, against the data regarding the actuation limit of the pre-tensioner 72 read by the control device 30.

In cases in which the control device 30 determines that the recline angle of the seatback 18 is less than the angle αs and the height of the seat cushion 16 is the height Hb or greater, and in cases in which the control device 30 determines that the recline angle of the seatback 18 is the angle αs or greater, the control device 30 does not actuate the pre-tensioner 72, even if a collision detection signal output from the collision detection sensor 76 is input to the control device 30 in a vehicle collision.

As previously described, if the webbing fold-back position at the tongue 51 is disposed further toward the vehicle upper side than the hip point of the occupant 56, the overlap amount OL (see FIG. 5) between the pelvis 56A (waist region) of the occupant 56 and the lap webbing 50B is reduced. If the pre-tensioner 72 were to be actuated and the buckle 54 pulled and moved toward the oblique vehicle lower-rear side in this state, the lap webbing 50B would attempt to move along the body of the occupant 56 toward the vehicle upper side of the pelvis 56A (waist region) of the occupant 56.

In the present exemplary embodiment, in cases in which the physical build of the occupant 56 is smaller than the predetermined size, if the height of the seat cushion 16 is the height Ha or greater, the webbing fold-back position at the tongue 51 could be disposed further toward the vehicle upper side than the hip point of the occupant 56 in the vehicle vertical direction. In cases in which the physical build of the occupant 56 is the predetermined size or larger, if the height of the seat cushion 16 is the height Hb or greater, the webbing fold-back position at the tongue 51 could be disposed further toward the vehicle upper side than the hip point of the occupant 56 in the vehicle vertical direction.

The pre-tensioner 72 is therefore not actuated in a vehicle collision when in such states, thereby enabling movement of the lap webbing 50B toward the vehicle upper side along the body of the occupant 56 to be suppressed, and thereby enabling a reduction in the overlap amount OL between the pelvis 56A (waist region) of the occupant 56 and the lap webbing 50B to be suppressed. Thus, a reduction in the ability to restrain the body of the occupant 56 using the webbing 50, and in particular the lap webbing 50B, can be suppressed. Thus, for example, during a frontal collision of the vehicle, the occurrence of what is known as the "submarining phenomenon", in which the upper body of the occupant 56 slips under the vehicle lower side of the lap webbing 50B and moves toward the vehicle front side, as well as movement of the lap webbing 50B from the waist region to the stomach region of the occupant 56, can be suppressed.

As previously described, when the upper body of the occupant 56 seated in the vehicle seat 14 tilts toward the vehicle rear side, the pelvis 56A of the occupant 56 also tilts toward the vehicle rear side. When the pelvis 56A of the occupant 56 tilts toward the vehicle rear side in this manner, the overlap amount OL between the pelvis 56A (waist region) of the occupant 56 and the lap webbing 50B might be reduced. If the pre-tensioner 72 were to be actuated and the buckle 54 pulled and moved toward the oblique vehicle lower-rear side in such a state, the lap webbing 50B would attempt to move along the body of the occupant 56 toward the vehicle upper side of the pelvis 56A (waist region) of the occupant 56.

In the present exemplary embodiment, regardless of the physical build of the occupant 56 and the height of the seat cushion 16, if the recline angle of the seatback 18 is the angle αs or greater, the pre-tensioner 72 is not actuated during a vehicle collision, thereby enabling movement of the lap webbing 50B toward the vehicle upper side along the body of the occupant 56 to be suppressed. This enables a reduction in the overlap amount OL between the pelvis 56A (waist region) of the occupant 56 and the lap webbing 50B to be suppressed. This enables a reduction in the ability to restrain the body of the occupant 56 using the webbing 50, and in particular the lap webbing 50B, to be suppressed, and enables movement of the lap webbing 50B from the waist region toward the stomach region of the occupant 56 to be suppressed.

This enables a reduction in the ability to restrain the body of the occupant 56 using the webbing 50, and in particular the lap webbing 50B, to be suppressed, even for example in cases in which the occupant 56 is seated in the vehicle seat 14 in a relaxed posture with the seatback 18 at a large recline angle during self-driving of the vehicle.

Fourth Exemplary Embodiment

Figure 12:
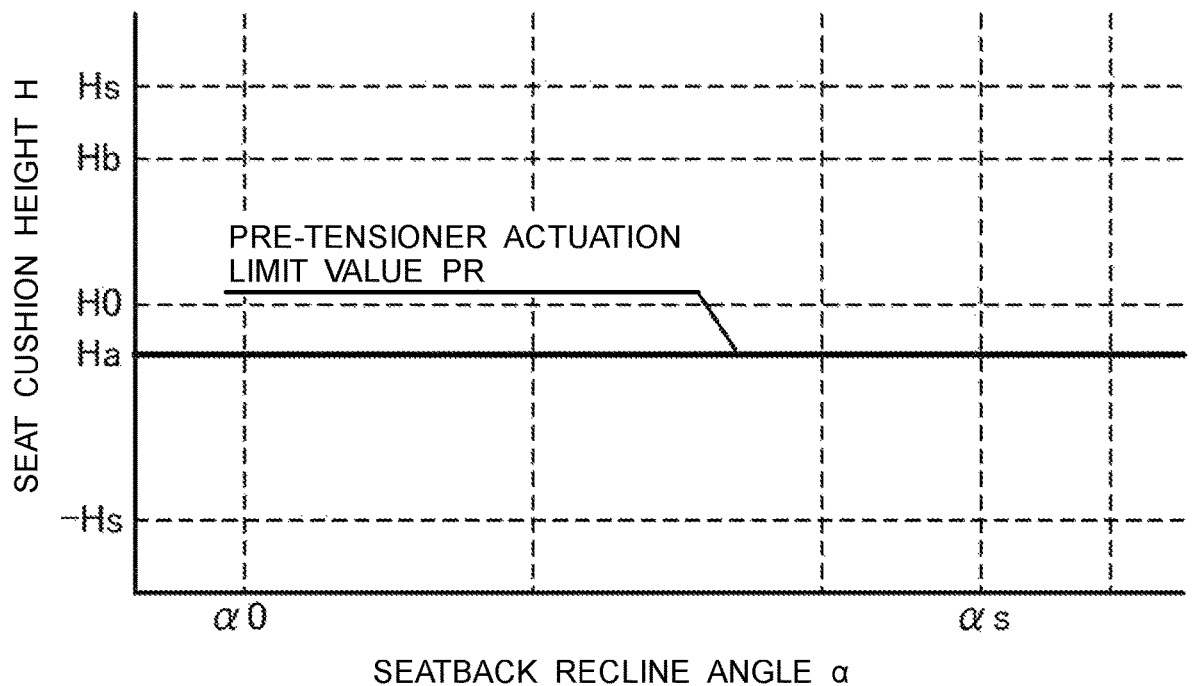
FIG. 12 is a graph illustrating a relationship between a recline angle of a seatback and a lower limit value for lowering of a seat cushion by a lift device at which actuation of a pre-tensioner is prohibited in cases in which the physical build of an occupant is smaller than a predetermined size, in a vehicle seat system according to a fourth exemplary embodiment.
Figure 13:
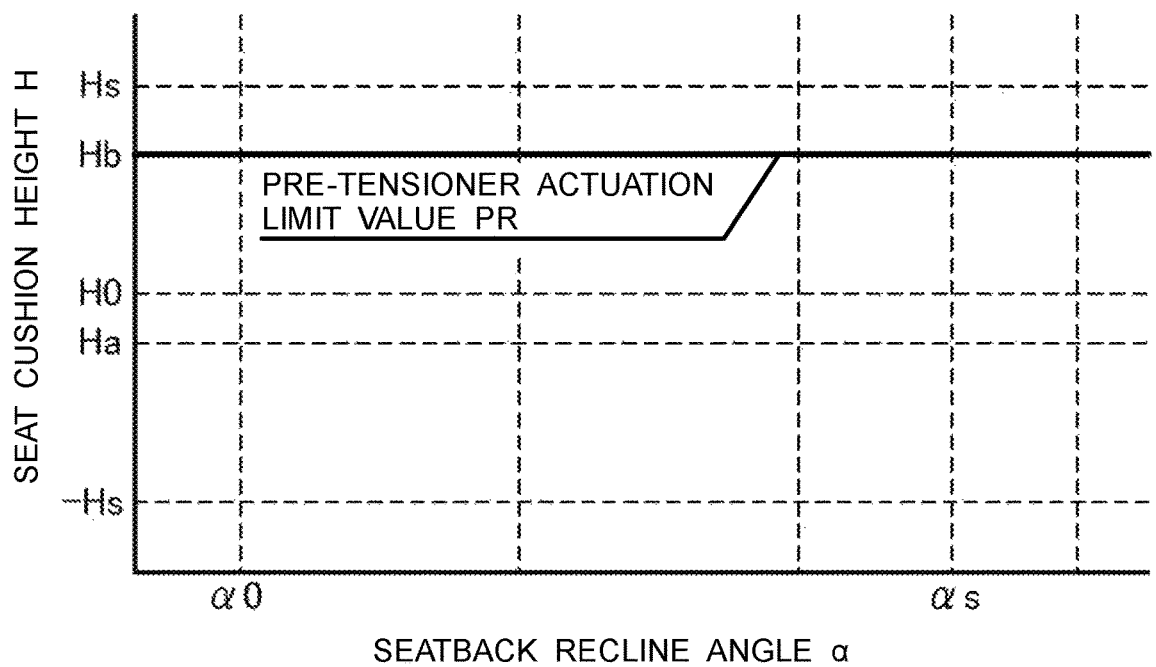
FIG. 13 is a graph illustrating a relationship between a recline angle of a seatback and a lower limit value for lowering of a seat cushion by a lift device at which actuation of a pre-tensioner is prohibited in cases in which the physical build of an occupant is a predetermined size or larger, in a vehicle seat system according to the fourth exemplary embodiment.

As illustrated in FIG. 12, in a fourth exemplary embodiment, in cases in which the physical build of the occupant 56 is smaller than a predetermined size, actuation of the pre-tensioner 72 is prohibited if the height of the seat cushion 16 is greater than the height Ha, regardless of the recline angle of the seatback 18. As illustrated in FIG. 13, in the present exemplary embodiment, in cases in which the physical build of the occupant 56 is the predetermined size or larger, actuation of the pre-tensioner 72 is prohibited if the height of the seat cushion 16 is greater than the height Hb, regardless of the recline angle of the seatback 18.

In such a configuration, not actuating the pre-tensioner 72 during a vehicle collision enables movement of the lap webbing 50B toward the vehicle upper side along the body of the occupant 56 to be suppressed, thereby enabling a reduction in the overlap amount OL between the pelvis 56A (waist region) of the occupant 56 and the lap webbing 50B to be suppressed. Thus, a reduction in the ability to restrain the body of the occupant 56 using the webbing 50, and in particular the lap webbing 50B, can be suppressed, and movement of the lap webbing 50B from the waist region toward the stomach region of the occupant 56 can be suppressed.

Moreover, in the present exemplary embodiment, the recline angle of the seatback 18 does not need to be detected in order to prohibit actuation of the pre-tensioner 72. The recline angle detection device 62 is therefore not necessary, enabling control of actuation of the pre-tensioner 72 by the control device 30 to be simplified.

Note that the first exemplary embodiment and second exemplary embodiment are configured such that raising or lowering of the seat cushion 16 is restricted according to the recline angle of the seatback 18 in cases in which the physical build of the occupant 56 is smaller than a predetermined size. However, if the recline angle is large, the overlap amount OL between the pelvis 56A (waist region) of the occupant 56 and the lap webbing 50B might still be reduced, even if the physical build of the occupant 56 is the predetermined size. The webbing fold-back position at the tongue 51 is therefore preferably spaced apart from and further toward the vehicle lower side than the hip point of the occupant 56 in such cases.

Thus, for example, configuration may be made such that lowering of the seat cushion 16 is restricted by the control device 30 if the recline angle is greater than a predetermined angle, even if the physical build of the occupant 56 is the predetermined size. Furthermore, configuration may be such that the seat cushion 16 is raised to at least the lowerable limit value in cases in which the seat cushion 16 is disposed at the vehicle lower side of the lowerable limit value due to a recline angle of the seatback 18, even if the physical build of the occupant 56 is the predetermined size.

Moreover, in the first exemplary embodiment and the second exemplary embodiment, the lift device 34 configures the sitting state changing device. However, for example, configuration may be made in which the recliner device 20 configures the sitting state changing device, limit values for the recline angle of the seatback 18 are set corresponding to heights of the seat cushion 16, and pivoting of the seatback 18 further toward the vehicle rear side than the limit value of the recline angle is restricted. Alternatively, configuration may be made such that in cases in which the height of the seat cushion 16 is changed so as to cause the recline angle of the seatback 18 to exceed the limit value, the recliner motor 24 is driven by the control device 30 so as to pivot the seatback 18 toward the vehicle front side.

Furthermore, in the first exemplary embodiment and second exemplary embodiment, when the recline angle of the seatback 18 is the angle α0 or greater, the lowerable limit value of the seat cushion 16 increases (settings are changed toward the vehicle upper side) as the recline angle increases. However, for example, configuration may be such that lowering of the seat cushion 16 is restricted to a constant lowerable limit value regardless of the recline angle in cases in which the physical build of the occupant 56 is smaller than a predetermined size.

Moreover, in the first exemplary embodiment and the second exemplary embodiment, the lowerable limit value of the seat cushion 16 is not changed when the recline angle of the seatback 18 is within the standard angle range. However, for example, configuration may be such that the lowerable limit value of the seat cushion 16 is increased (settings are changed toward the vehicle upper side) when the recline angle of the seatback 18 is within the standard angle range. Namely, configuration may be such that the lowerable limit value of the seat cushion 16 is changed according to change in the recline angle of the seatback 18, even when the recline angle of the seatback 18 is within the standard angle range.

Furthermore, in each of the above exemplary embodiments, a rotary encoder is applied as both the seat height detection device 60 and the recline angle detection device 62. However, for example, displacement sensors may be applied that detect changes in the height of the seat cushion 16 or changes in the recline angle of the seatback 18 based on changes in electrical resistance or using a laser. Namely, as long as the seat height detection device is capable of directly or indirectly detecting the height of the seat cushion 16, there is no limitation to its specific form, and as long as the recline angle detection device is capable of directly or indirectly detecting the recline angle of the seatback 18, there is no limitation to its specific form.

Moreover, in each of the above exemplary embodiments, the load sensor 52 is applied as the physical build detection device. However, for example, the physical build detection device may have a configuration in which the physical build of the occupant 56 is detected based on an image captured by a camera mounted inside the vehicle cabin. Alternatively, the physical build detection device may have a configuration in which a vehicle front-rear direction position of the vehicle seat 14 is detected, and the approximate physical build of the occupant 56 is determined based on the detection result, or a configuration in which the approximate physical build of the occupant 56 is determined based on a pull-out amount of the webbing 50 from the retractor 46. Namely, as long as the physical build detection device is capable of detecting the physical build of the occupant 56, there is no limitation to its specific form.

What is claimed is:

1. A vehicle seat system comprising:
  a vehicle seat that is provided with a seatback at a vehicle rear side of a seat cushion on which an occupant can sit;
  a seatbelt device that includes a buckle fixed to a vehicle body side so as not to follow vehicle vertical direction movement of the vehicle seat, and that restrains a waist region of the occupant using a webbing having an elongated belt-shape, by retaining a tongue provided to the webbing with the buckle in a state in which the webbing has been passed across a body of the occupant;
  a sitting state changing device that is configured to actuate such that at least one of the seat cushion or the seatback is moved so as to change a sitting state, the sitting state being a sitting position of the occupant or a sitting posture of the occupant; and
  a control device that is configured to restrict movement of at least one of the seat cushion or the seatback by the sitting state changing device, based on one or both of a physical build of the occupant seated in the vehicle seat or a relative positional relationship between the vehicle seat and the buckle.

2. The vehicle seat system of claim 1, wherein:
the sitting state changing device is configured including a lift device configured to actuate such that the seat cushion is raised or lowered in a vehicle vertical direction; and
the control device is configured to restrict lowering of the seat cushion by the lift device.

3. The vehicle seat system of claim 2, wherein the control device restricts lowering of the seat cushion by the lift device in cases in which the physical build of the occupant seated in the vehicle seat is smaller than a predetermined size.

4. The vehicle seat system of claim 2, wherein:
the sitting state changing device is configured including a recliner device that is actuated to pivot the seatback in a vehicle front-rear direction about a vehicle lower side end portion of the seatback; and
the control device is configured to restrict lowering of the seat cushion such that a lowerable range of the seat cushion by the lift device is reduced as a tilt angle of the seatback toward the vehicle rear side is increased by the recliner device.

5. The vehicle seat system of claim 4, wherein:
in cases in which the seatback has been pivoted further toward the vehicle rear side than a pivot angle of the seatback toward the vehicle rear side corresponding to a lowerable limit value configuring a lower limit of the lowerable range of the seat cushion by the control device, the control device actuates the lift device to raise the seat cushion to at least the lowerable limit value.

6. The vehicle seat system of claim 2, wherein:
a lowerable limit value configuring a lower limit of a lowerable range of the seat cushion by the control device is configured such that a fold-back position of the webbing at the tongue retained by the buckle is at a same vehicle vertical direction position as a hip point of the occupant, or at a position disposed further toward a vehicle lower side than the hip point.

* * * * *